United States Patent [19]
Matras et al.

[11] 3,837,629
[45] Sept. 24, 1974

[54] GAS DIFFUSING MECHANISM
[75] Inventors: Edward J. Matras, Palatine; Fred W. Broling, Barrington, both of Ill.
[73] Assignee: FMC Corporation, Chicago, Ill.
[22] Filed: July 2, 1973
[21] Appl. No.: 375,676

[52] U.S. Cl........ 261/122, 251/149.2, 261/DIG. 47, 285/27
[51] Int. Cl............................................ B01f 3/04
[58] Field of Search............ 261/122, 124, DIG. 47; 285/24, 27, 286, 189; 251/149.2

[56] References Cited
UNITED STATES PATENTS

| | | | |
|---|---|---|---|
| 2,415,048 | 1/1947 | Sharp | 261/124 |
| 3,127,148 | 3/1964 | Collar | 251/149.2 |
| 3,174,733 | 3/1965 | Chase | 261/124 |
| 3,339,901 | 9/1967 | Walker | 261/124 |
| 3,452,966 | 7/1969 | Smolski | 261/124 X |
| 3,459,442 | 8/1969 | De Yarmett | 285/27 |
| 3,785,629 | 1/1974 | McKinney | 261/122 |

Primary Examiner—Tim R. Miles
Assistant Examiner—Richard L. Chiesa
Attorney, Agent, or Firm—Dressler, Goldsmith, Clement & Gordon, Ltd.

[57] ABSTRACT

The apparatus provides for releasably coupling diffusion headers to a main gas distribution line which is fixedly positioned in an aeration tank. The main distribution line includes a plurality of access passages adapted to receive gas communication channels extending from each diffusion header. The access passages are provided with positive closure means which prevent the escape of gas from the distribution line when a diffusion header is removed from the tank for service. The closure means are opened when a header is lowered by a swing-type linkage and the header channel is inserted into the access passage.

9 Claims, 5 Drawing Figures

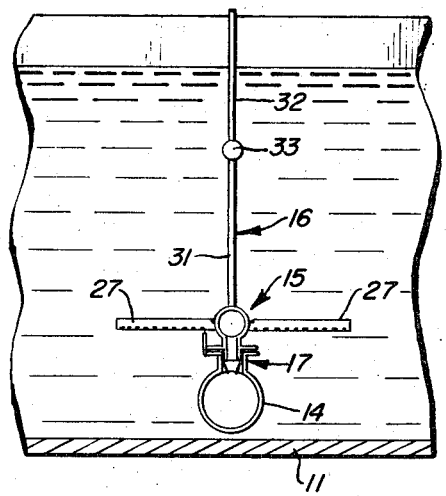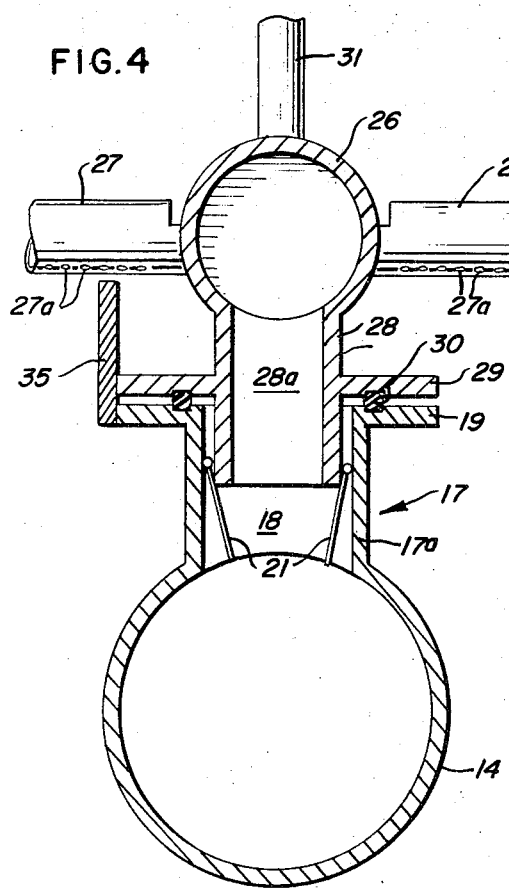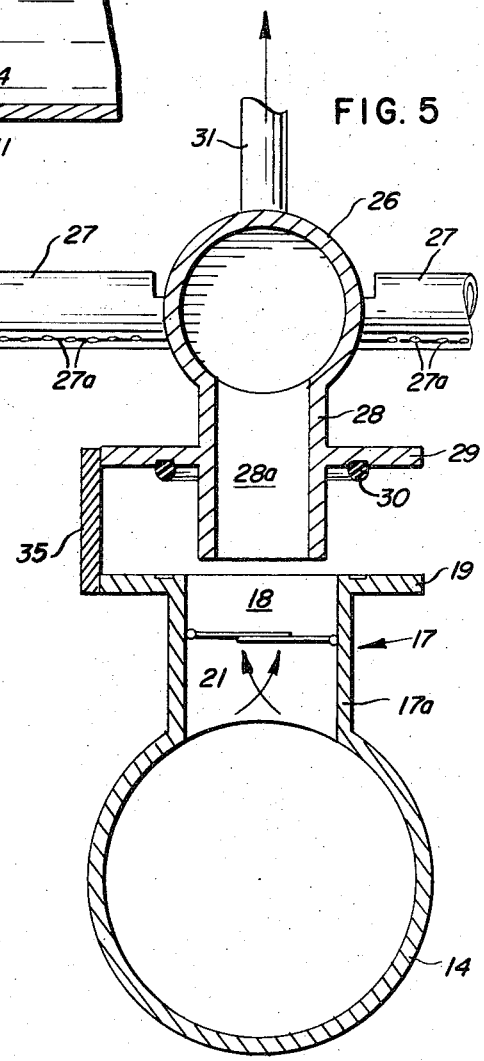

GAS DIFFUSING MECHANISM

BACKGROUND OF THE INVENTION

Systems for gasifying liquids such as aqueous mediums, sewage and industrial waste, customarily involve tanks holding appreciable volumes of liquid and extensive gas piping installations with elaborate associated mechanisms for breaking up the gas streams into relatively small bubble form.

Systems, for example, for treating sewage, have aerators disposed inside the tanks and submerged well below the normal liquid level in the tank. Such aerators tend, over a period of time, to accumulate solid matter which interferes with gas dispersion.

Operating difficulties have made it necessary to design equipment which can be readily serviced. In order to facilitate servicing without having to dewater the tank, gas dispersion units have been suspended in a manner permitting the units to be raised above the liquid level by swinging the unit upwardly out of the tank, as illustrated in Chase U.S. Pat. No. 3,174,733, and Walker U.S. Pat. No. 3,339,901.

Diffuser headers in use, heretofore supported by lift apparatus of the so-called swing type, have been limited as to length and have been characterized by air pipes providing at least part of the mechanical support through pivotal connections between the header units and hanger pipes, and between the hanger pipes and the stationary header from which the swing is supported.

As the volume of sewage flowing into established sewage treatment plants has increased and requirements for the degree of treatment have been raised, increases in the capacity of treatment tanks have been required. Since the treatment plants in many areas have little space available for expansion, the increased requirements have had to be met by substantial increases in tank depth.

Raising long headers and associated diffusers out of deep tanks presents serious problems. The cantilever effect of the weight of large headers and banks of diffusers plus the liquid which fills them when the air is shut-off, is often too great for the strength of the construction materials and overstress results, which may result in breakdowns at the points where pivotal connections are made to stationary piping.

In addition to the difficulties in raising large diffusion headers, the necessity of supplying individual gas lines to the header diffusers resulted in substantial head loss in gas pressure.

SUMMARY OF THE INVENTION

The gas diffuser apparatus of the present invention provides a means for releasably coupling diffuser headers with multiple diffusers radiating therefrom to a gas distribution main so that the diffuser header may be removed from the tank for service without shutting down the aeration apparatus or dewatering the tank. The apparatus of the present invention also allows all the headers to be removed from the liquid at the same time without removing the main distribution line.

Briefly, the apparatus for diffusing gas in tanks containing liquid mediums of this invention comprises a main gas distribution line fixedly positioned at the bottom of the tank and provided with a plurality of access passages along its length. Each access passage or opening is adapted to receive an individual header section to provide gas thereto. Each header has a plurality of gas diffusers and is provided with a downwardly extending channel adapted to be inserted into the access opening in the main distribution line to place header in communication therewith.

The access passage in the main distribution line is provided with positive closure means which seals the access passage to prevent the escape of gas when a diffuser header is removed. Complementary support flanges are formed about the access port of the distribution main and the header channel so that the individual header channels are self-supporting when inserted into the distribution main. When the header channel is fully inserted in the main distribution line access passage, the positive closure means is opened, and the header is placed in communication with the gas supply.

Each diffuser header is provided with a swing-type lifting linkage which may be coupled to a lifting mechanism so that the individual header may be raised in a swing manner from its inserted position for cleaning and maintenance.

When a plurality of diffusion headers are utilized, it is possible to remove a single header from the tank for cleaning without shutting down the entire system or dewatering the tank so that the on-line time for the tank is increased. In installations where downtime is not critical and the tank may be taken out of service for cleaning, the entire set of headers may be removed simultaneously by means of a plurality of hoisting mechanisms, one for each header.

As is readily apparent from the above discussion, the diffuser apparatus of the present invention reduces the head loss in gas pressure, as opposed to prior art swing-type diffusers which supply gas through complex fittings, to increase the efficiency of the system and provide for individualized service to each header which may result in cost savings in supporting service equipment.

The structure by which the above-mentioned and other advantages are obtained is disclosed in detail in the following specification, taken in conjunction with the accompanying drawings showing the preferred illustratve embodiment of the invention.

DESCRIPTION OF THE DRAWINGS

FIG. 3 is a fragmentary end view showing the apparatus in the operating position in the tank;

FIG. 4 is an enlarged sectional view illustrating the apparatus in the operating position; and FIG. 5 is an enlarged sectional view showing the apparatus removed from the main distribution line.

DETAILED DESCRIPTION OF THE PREFERRED EMBODIMENT

Figure 1:
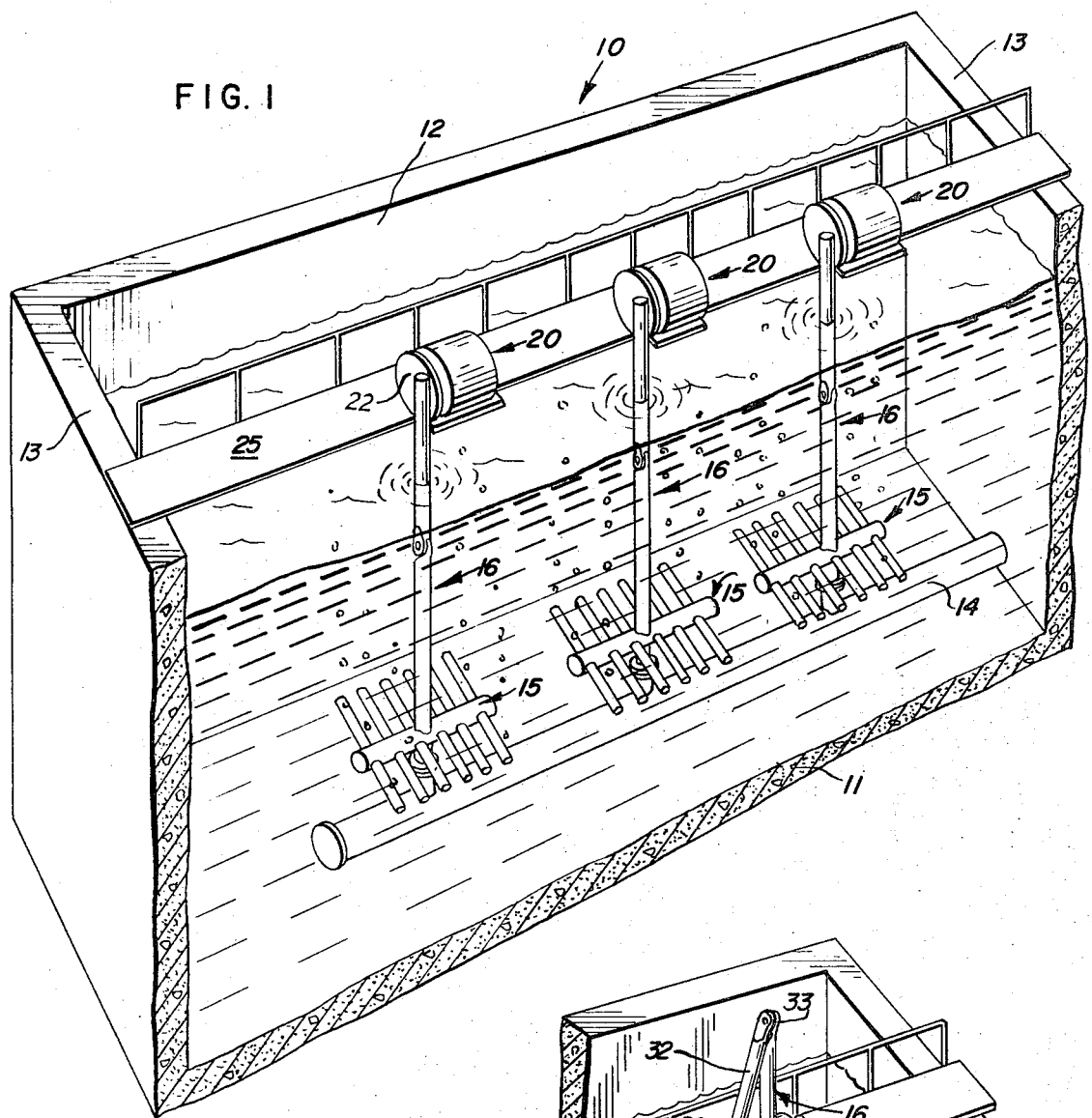
FIG. 1 is a perspective view showing the diffusion apparatus of the present invention in the operating position in a tank.

While this invention is susceptible of embodiment in many different forms, there is shown in the drawings and will herein be described in detail, a preferred embodiment of the invention, with the understanding that the present disclosure is to be considered as an exemplification of the principles of the invention and is not intended to limit the invention to the embodiment illustrated.

Referring to FIG. 1, there is shown a sewage treatment tank 10 having a bottom 11, longitudinal vertical walls 12 and vertical end walls 13. A main gas distribution line 14 extends outwardly from one end wall at the bottom of the tank and extends longitudinally along substantially the entire length of the tank. Positioned at spaced intervals along the length of the tank are diffusion header assemblies 15 which are in communication with the main gas distribution line, as will be described in greater detail below. Extending upwardly from each diffusion header assembly is a hoisting linkage 16 which may be attached to a rotary hoisting mechanism 20 at its upper end. The hoisting mechanisms 20 are supported on a catwalk 25 extending along the length of the tank above the water-line.

Referring now to FIGS. 3 and 4, there is shown in detail the apparatus of the present invention in its operative position. The main gas distribution line 14, which supplies gas for the gas diffusion operation, has a plurality of upwardly-facing access means 17 formed at spaced intervals along its length. Access means 17 may be formed in any convenient manner, as by welding a tube 17a to distribution line 14, to provide a passage 18. A horizontally disposed supporting flange 19 is provided at the upper end of tube 17a which cooperates with a complementary flange on header assembly 15, to provide free-standing support of the header assembly.

Positive closure means 21, such as a spring-loaded valve, is provided in the throat of passage 18 to seal the passage when the header assembly is removed (FIG. 5), to prevent the escape of gas and thus maintain gas line pressure to the remaining diffusion header assemblies.

Each diffusion header assembly 15 consists of a suitable diffusion apparatus. As shown in the drawings, the apparatus includes a longitudinally-extending header section 26 which mounts a plurality of radiating diffusers 27. Diffusers 27 are in communication with the interior of header section 26 and are provided with diffusion ports or holes 27a to dispense the gas throughout the liquid in the tank.

Extending downwardly from the mid-portion of the header section is a channel member 28 which is adapted to be inserted into access passage 18. Channel member 28 defines a central passage 28a and includes a horizontal supporting surface or flange 29 spaced upwardly from the lower end of the channel member. As illustrated in FIG. 4, flange 29 supports the diffusion header assembly 15 in its operative position on flange 19 due to the weight of the header.

Sealing means 30, such as an O-ring or gasket, is provided on the lower surface of flange 29 and is brought into sealing engagement with the upper surface of flange 19 when the header assembly is in the operative position to provide an air-tight connection between the access passage and the header channel.

To provide for the ready insertion and removal of the diffusion header assembly 15, swing-type linkage 16 extends upwardly from the top of the header section 26 to an elevation above the water-line of the tank to the elevation of the hoist mechanism. The linkage includes two links of substantially the same length, a fixed link 31 attached at one end to the header section, and a pivot link 32 attached to the other end of link 31 by means of a pivot connection 33. When it is desired to remove the header assembly 15, hoisting mechanism 20, positioned on the catwalk, is attached to the upper end of pivot link 32 to raise the header assembly in a swing-like manner (FIG. 2) to the elevation of the catwalk for servicing. Although the pivot link 32 is shown as being connected to the hoist mechanism 20 in FIG. 1, it will be appreciated that the linkage 16 is free-standing and that during normal operation of the aeration tank, is not connected to a hoist mechanism. In this manner, one hoist mechanism may function to service a plurality of diffusion header assemblies.

Figure 2:
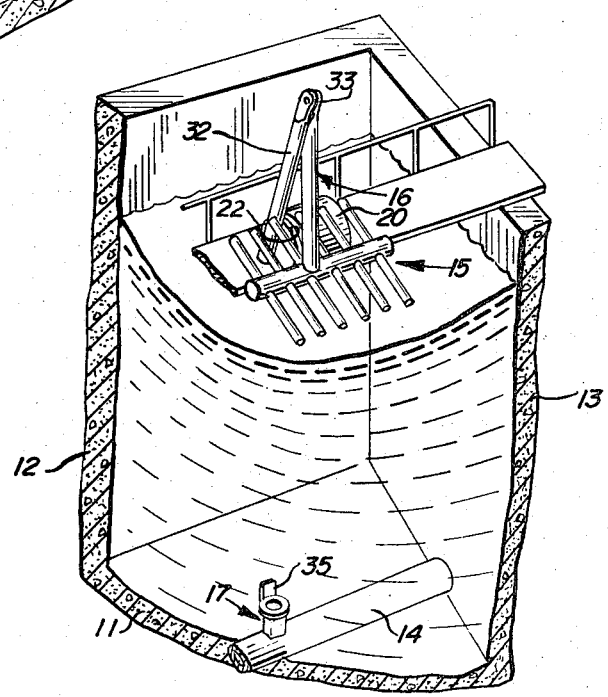
FIG. 2 is a perspective view of the apparatus when the header is in its servicing position above the water level in the tank.

The operation of the apparatus for insertion and removal of the diffusion header assembly is as follows:

Referring to FIG. 2, the free end of the pivot link 32 is connected, as by a pivot pin, to a crank 22 of the hoist mechanism 20, and the linkage is placed in a folded position, as illustrated, with the diffuser assembly 15 positioned above the water-line and in the plane of the access passage 18 of the main distribution line. The hoist mechanism then lowers diffusion header assembly 15 into the liquid, and the assembly, due to the swing-type linkage, aligns itself with the channel member 28 in axial relationship with the access passage 18. To facilitate the alignment of these elements, a vertical upwardly-extending stop 35 is provided at the edge of flange 19 opposite to the direction of swing of the diffuser header assembly. The linkage swings down until the forward edge of flange 29 contacts the upper portion of stop 35, thereby aligning channel member 28 with passage 18.

The diffuser assembly is then lowered vertically to introduce the channel member 28 into access passage 18 and the leading edge of the channel bears against the closure means 21 to open the passage and place the diffusion header assembly in communication with the main gas distribution line. As the diffusion header assembly is lowered, the gasket 30 seats on the upper surface of flange 19 to provide a fluid-tight communication between the main distribution line and the diffusion header.

After the diffusion header assembly has been lowered completely, the flanges 19 and 29 function to support the assembly and the upper end of the pivot link may be disconnected from crank 22 of the hoist mechanism.

To remove the diffusion header assembly for servicing, the upper end of the pivot link is again connected to the crank of the hoist mechanism and the header assembly is first lifted vertically upwardly out of access passage 18 so that closure means 21 seals the main distribution line and thus prevents escape of gas (FIG. 5). After the lower edge of channel member 28 has cleared the top surface of flange 19, the linkage 16 is pivoted in swing-like fashion to raise the header assembly above the water-line and to the catwalk for servicing.

While the drawings illustrate individual hoist mechanisms for each header assembly, it will be readily appreciated that a composite portable hoisting mechanism for lifting all of the diffusion header assemblies may be provided to reduce the overall servicing time, if desired.

We claim:

1. Apparatus for diffusing gas in a liquid medium contained in a tank comprising: an elongated gas distribution main positioned in said tank below the liquid level therein and adapted to receive gas from a source, said main having a plurality of access means at spaced intervals along its length, said access means including closure means biased towards a closed position; a gas diffusion header assembly including a header having a channel adapted to be inserted into said access means and open said closure means to provide communication between said header and said main; said channel having support means for supporting said header on said main.

2. Apparatus as set forth in claim 1 wherein said positive closure means includes a spring-loaded valve located in each access means.

3. Apparatus as set forth in claim 1 wherein said header support means includes a radially-extending flange positioned on said channel and spaced from the lower end thereof, and said access means includes a corresponding flange whereby said header assembly is supported by said flanges.

4. Apparatus as set forth in claim 3, further including sealing means between said flanges to prevent gases from escaping between said flanges.

5. Apparatus as set forth in claim 1 further including means for sealingly engaging said channel with said access port.

6. Apparatus as set forth in claim 1, further including swing-type linkage means attached to and extending upwardly from said header, whereby said header may be raised and lowered into said access means.

7. Apparatus for diffusing gas in a liquid medium contained in a tank comprising: an elongated gas distribution main positioned in said tank below the liquid level therein and adapted to receive gas from a source, said main having a plurality of access means extending upwardly therefrom at spaced intervals along its length, each said access means including an upwardly facing tube having a swing-type check valve positioned therein, and a radially extending horizontal flange at its upper end; a gas diffusion header assembly including a header having a downwardly-facing channel adapted to be inserted in said tube and open said check valve to provide communication between said header and said main; a radially extending flange position on said channel and spaced from the lower end thereof, said access means flange being adapted to bear against said channel flange when said channel is fully inserted in said tube whereby said header assembly is supported thereon.

8. Apparatus as set forth in claim 7 further comprising: a service structure located on said tank above the liquid level therein; pivoting means positioned on said structure above said access means for raising said diffusion headers; swing-type linkage means attached to said header and being of sufficient length to extend upwardly to said pivoting means when said header channel is inserted in said tube; and means for coupling the upper end of said linkage means to said pivoting means, said linkage means including two pivotally end-to-end connected links of substantially the same length whereby said diffusion header assembly will be moved to a position adjacent said service structure when said pivoting means moves said links to a raised position.

9. Apparatus for diffusing gas in a liquid medium contained in a tank comprising: an elongated gas distribution main positioned in said tank below the liquid level therein and adapted to receive gas from a source, said main having access means, said access means including closure means biased towards a closed position; a gas diffusion header assembly including a header having passage means adapted to be disposed in communication with said access means; sealing means for preventing the escape of gas as it flows between said access means and said passage means, said header having means for opening said closure means during the communication of said passage means with said access means whereby gas may flow to said header from said main.

* * * * *